(12) United States Patent
Lauper et al.

(10) Patent No.: US 8,089,358 B2
(45) Date of Patent: Jan. 3, 2012

(54) METHOD AND SYSTEM FOR INPUTTING USER INSTRUCTIONS OF A USER CONTROLLABLE TELECOMMUNICATIONS DEVICE

(75) Inventors: Eric Lauper, Berne (CH); Karin Busch Lauper, Berne (CH)

(73) Assignee: Swisscom AG, Berne (CH)

( * ) Notice: Subject to any disclaimer, the term of this patent is extended or adjusted under 35 U.S.C. 154(b) by 526 days.

(21) Appl. No.: 11/576,287

(22) PCT Filed: Sep. 29, 2004

(86) PCT No.: PCT/EP2004/052358
§ 371 (c)(1),
(2), (4) Date: Mar. 29, 2007

(87) PCT Pub. No.: WO2006/034732
PCT Pub. Date: Apr. 6, 2006

(65) Prior Publication Data
US 2008/0068166 A1    Mar. 20, 2008

(51) Int. Cl.
*G08B 13/14*    (2006.01)
(52) U.S. Cl. ............... 340/572.1; 340/10.1; 379/201.01; 379/211.02; 379/211.05; 455/414.1; 455/417; 455/426.1; 455/456.1; 455/556.1
(58) Field of Classification Search ................. 340/572.1
See application file for complete search history.

(56) References Cited

U.S. PATENT DOCUMENTS

| | | | |
|---|---|---|---|
| 4,658,416 A * | 4/1987 | Tanaka | 455/417 |
| 5,515,426 A * | 5/1996 | Yacenda et al. | 379/201.07 |
| 6,545,589 B1 * | 4/2003 | Fuller et al. | 340/7.22 |
| 7,433,649 B2 * | 10/2008 | Toulis et al. | 455/41.2 |
| 2003/0163710 A1 * | 8/2003 | Ortiz et al. | 713/186 |
| 2004/0002305 A1 | 1/2004 | Byman-Kivivuori et al. | |
| 2005/0054290 A1 * | 3/2005 | Logan et al. | 455/41.2 |
| 2005/0064855 A1 * | 3/2005 | Russell | 455/417 |
| 2005/0099307 A1 * | 5/2005 | Gilfix et al. | 340/573.1 |
| 2005/0125745 A1 * | 6/2005 | Engestrom et al. | 715/847 |
| 2006/0033623 A1 * | 2/2006 | Hines et al. | 340/572.1 |

FOREIGN PATENT DOCUMENTS

| | | |
|---|---|---|
| EP | 0 762 715 | 3/1997 |
| JP | 54-161807 | 12/1979 |

* cited by examiner

*Primary Examiner* — Benjamin C Lee
*Assistant Examiner* — Curtis King
(74) *Attorney, Agent, or Firm* — Oblon, Spivak, McClelland, Maier & Neustadt, L.L.P.

(57) ABSTRACT

A method, a system, and a device for inputting user instructions of a user-controllable telecommunication device. An RFID transponder is introduced into a sphere of scope of an RFID transceiver and the RFID identification data of the RFID transponder is transmitted to the RFID transceiver. The RFID identification data and/or RFID transceiver identification are transmitted to a collection module by the RFID transceiver. An assigned user instruction is selected by the collection module and by tables containing RFID identification data and tables containing RFID transceiver identifications accessible by the collection module and controlling the user-controllable telecommunication device by the collection module in accordance with the selected user instruction.

6 Claims, 1 Drawing Sheet

METHOD AND SYSTEM FOR INPUTTING USER INSTRUCTIONS OF A USER CONTROLLABLE TELECOMMUNICATIONS DEVICE

TECHNICAL FIELD

The present invention relates to a method, a system and a device for inputting user instructions into a user-controllable telecommunication device, whereby a RFID transponder is brought into the sphere of scope of an RFID transceiver and whereby RFID identification data are transmitted from the RFID transponder to the RFID transceiver.

STATE OF THE ART

In recent years the number of users of telecommunication devices has increased rapidly. By now, many persons are in possession of a multitude of different telecommunication devices such as, for example, landline terminals at home or in the office, which are connected via a landline network or via a mobile radio terminal, usable via a mobile radio network. Telecommunication devices are controllable by means of user instructions selected by the user. A user instruction for controlling a telecommunication device creates, for example, a user-specific configuration of a telecommunication terminal and/or of a central processing unit of a telecommunication network. A user of a landline telephone can, by inputting a user instruction, for example control a central processing unit of a telecommunication network in such a way that calls to this landline telephone are forwarded to a mobile radio terminal of the user. The user can, for example when leaving the workplace, enter this user instruction into the landline business telephone installed at the workplace, and then remain available on the mobile radio telephone for calls to the business number. A user instruction can however also be applied to the deactivation of a first SIM (Subscriber Identity Module) card of a first mobile radio terminal and the subsequent activation of a second SIM card of a second mobile radio terminal, or to the activation of that SIM card, which has been set aside for incoming calls. A user in possession of a first mobile radio terminal with features which are especially suitable for business use, and a second mobile radio device with features especially suited to leisure time activities, can, by inputting a user
Instruction for controlling a telecommunication device such as, for example, a Home Location Register in this case, initiate the activation of his preferred mobile radio device. The state of the art inputting of user instructions is done via the keyboard of a telecommunication terminal by pressing a combination or sequence of keys. In doing so, the user can be suitably assisted, for example, by means of a display attached to the telecommunication device, as well as by a menu-based indication and a selection of user instructions. Often the inputting of a user instruction is based on the control method of a telecommunication device which is always the same. A user who, for example, activates the call forwarding feature when leaving the office, and deactivates it again in the morning when entering the office, will therefore execute the same combination and/or sequence or keys every day. Hereby it is often necessary to observe the indications of a menu-based display device.

A method is known, for example, from the patent specification U.S. Pat. No. 6,446,127 B1, in which a user of a Personal Information Device (PID) can transmit data to a central processing unit of a telephone network, whereby a call forwarding feature is activated or deactivated due to this data, whereby the PID is programmable to initiate an activation or deactivation at a particular time of day or according to a calendar that has been entered. A disadvantage of this procedure is that the user must manage the time of entering a user instruction by means of inputting corresponding time data into the PID, where even minor changes in the behavior of the user in comparison with the time schedule stored in the PID, require adjustments to be made. A further disadvantage of this procedure is that the user must continue to execute various user instructions using a menu-based input device.

In recent years, the state of the art technology of so-called RFID (Radio Frequency Identification) technology has continue to develop. RFID technology in essence entails an RFID transceiver for acquiring RFID data of a RFID transponder (TRANSmit/resPOND). RFID transponders are also known in state of the art technology as RFID tags. RFID data may encompass just one bit, for example, for monitoring theft at the exit of a department store. For this type of theft control, RFID transponders are attached to the articles to be monitored. At the exit of the store, as RFID transponders are removed from the article or deactivated after the required payment has been made, an RFID transceiver checks to see whether such an RFID transponder an be detected. RFID data can however amount to several hundred kBytes, for example for the documentation of the manufacturing stages and test results of an industrial work piece. Such documentation, for example, has the advantage that manufacturing steps can be optimally adapted to preceding manufacturing steps. RFID transponders can on the one hand be designed in such a way that RFID data can only be read out. On the other hand, RFID transponders can also be designed in such a way that RFID data can be read out of RFID transponders as well as being written into them. The operating principle of the RFID technology relies on the capacitative or inductive coupling and decoupling of electro-magnetic waves, whereby the distance between the RFID transponder and the RFID transceiver may amount to only a few centimeters or, for example, up to thirty meters. Active RFID transponders are equipped with an own energy source for example a battery, Passive RFID transponders do not possess an own energy source. When using a passive RFID transponder energy for activating the electronics of the RFID transponder can, for example, be inductively coupled and for example be used for charging a condenser. As soon as this condenser possesses enough energy, the control electronics of the RFID transponder can, for example, initiate the decupling of RFID data. The decoupling takes place by, for example, emitting suitably modulated electromagnetic waves.

DISCLOSURE OF THE INVENTION

It is an object of the present invention to propose a new method and a new system for inputting user instructions, which do not possess the disadvantages of state of the art technology.

According to the present invention these objectives are achieved in particular by the elements of the independent claims. In addition, further advantageous embodiments emerge from the dependent claims and the description.

In particular, these objectives are achieved by the invention by bringing a RFID transponder into the sphere of scope of an RFID transceiver for inputting user instructions of a user-controllable telecommunication device, whereby RFID identification data of the RFID transponder is transmitted to the RFID transceiver. The RFID identification data and/or an RFID transceiver identification is/are transmitted by the RFID transceiver to a collection modules, whereby an assigned user instruction is selected by means of the collection module as well as by means of tables containing RFID identification data and/or tables containing RFID transceiver identifications, accessible to the collection module, whereby the user-controllable telecommunication device is controlled by means of the collection module according to the selected user instruction. Such a method has the particular advantage that the user is able to initiate a user instruction quickly and easily. As RFID transponders can be manufactured very cheaply and very small, the user may, for example, take along several RFID transponders and initiate the required user instruction by bringing the corresponding RFID transponder into the sphere of scope of the RFID transceiver.

In one embodiment the RFID identification data as well as the RFID transceiver identification are transmitted to a collection module connectable to the telecommunication network by means of a connection module connectable to a RFID transceiver and a telecommunication network. Such a method has the particular advantage that an existing telecommunication network an easily be completed by means of the devices required for executing the procedures according to the present invention. The methods according to the invention also have another advantage, namely that inputting a user instruction is very simple. The method is particularly suited to older persons and/or those with visual impairments and/or persons suffering from motor (multiple sclerosis) or other disorders (Alzheimer's). These persons are unable to input complex user instructions into a terminal, but are still able to make an RFID transponder interact with an RFID transceiver by means of correspondingly more expansive movements.

In another embodiment, RFID identification data as well as the RFID transceiver identification are transmitted to a collection module integrable to the user-controllable telecommunication device. Such a method has the particular advantage that the collection module may, for example, be designed as a software module, so that existing telecommunication devices can easily be completed with the devices required for executing the methods according to the present invention.

In another embodiment, the user instruction relates to the activation or deactivation of a call forwarding feature that forwards calls intended for a first telecommunication device to a second telecommunication device. Such a method has the advantage that users can activate the user instruction initiating the call forwarding feature, for example by means of any suitable connection module.

In another embodiment, the user instruction relates to the selection of a user profile of a telecommunication terminal. Such a method has the advantage that a user can easily load a personal user profile into a telecommunication terminal. In a first phase the user profile and permitted user instructions can for example, be managed via the Internet by means of a PC. In a subsequent phase, the corresponding user instructions can be activated by means of an RFID transponder according to the method according to the invention. The user profile would contain details about languages, gender, location etc. of the user, which may for example, be used as a filter for particular services.

In another embodiment, the user instruction relates to the initiation of a payment in a payment transaction procedure. Such a method has the advantage that a user can very easily initiate a payment. In this way for example data content that can be purchased that can be played back via a telecommunication network as an object (MP3 file) or as a data stream (TV broadcast).

In another embodiment, the user instruction relates to the deactivation of a first SIM module of a first mobile radio terminal and the activation of a second SIM module of a second mobile radio terminal. Such a method has the advantage that a user can switch very easily between the two mobile radio terminals.

In another embodiment, the user-controllable telecommunication device relates to the switchboard of a landline network or to a Home Location Register of a mobile radio network or to a Visiting Location Register or to any other similar register of a mobile radio network. Such a method has the advantage that changes to such a register can be done from any suitable location.

In another embodiment, the telecommunication network relates to a mobile radio network and/or a landline network and/or an Internet-based network and/or a Wireless Local Area Network (WLAN) and/or a Power Line Communication (PLC) network and/or a able-based network. Such a method has the advantage that a high degree of interoperability between the various telecommunication networks is ensured. Parameters, for example user-related parameters for the user of a mobile radio network can, for example, be modified via a PLC network, in fact, independently of the transmission quality of the mobile radio network or even in the absence of the coverage of a location by the mobile radio network or in the absence of a roaming agreement.

In another embodiment, the RFID transceiver is attached to a telecommunication terminal, whereby the RFID identification data and the RFID transceiver identification together with data of the telecommunication terminal are transmitted to the collection module, and whereby the collection module selects an assigned user instruction by means of corresponding tables containing RFID identification data and RFID transceiver identifications as well as a corresponding table of telecommunication terminals data. Such a method has the advantage of increasing security during the inputting of a user instruction.

At this point it should be stressed that the present invention, in addition to the method to which this invention relates, also relates to a system for executing this procedure.

BRIEF DESCRIPTION OF THE DRAWING

The different embodiments of the present invention are described be low with the aid of examples; the examples of the embodiments are illustrated by the following attached FIGURE.

EMBODIMENT(S) OF THE INVENTION

Figure 1:
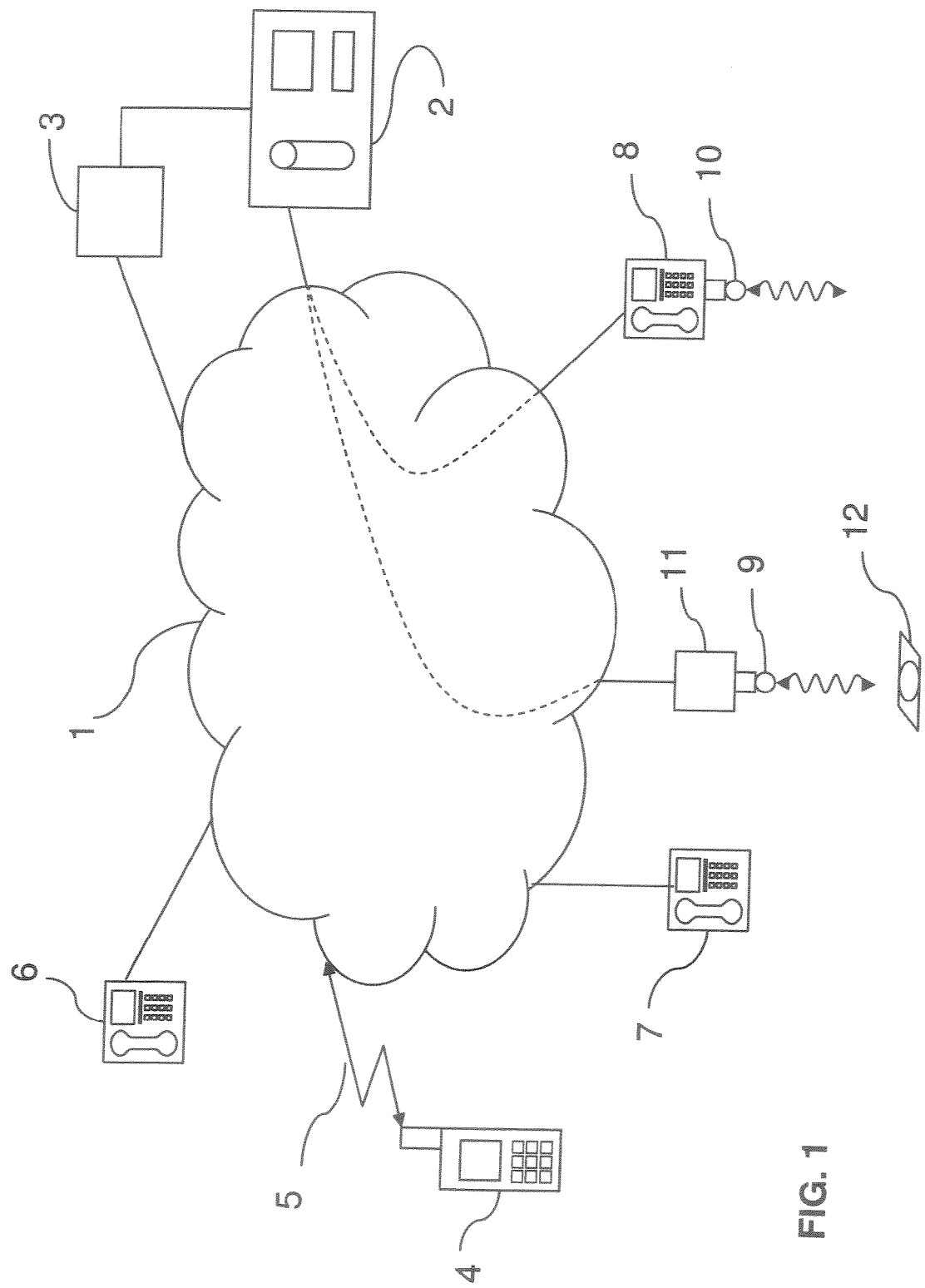
FIG. 1 shows a block diagram, which schematically illustrates a method and a system for inputting user instructions, whereby an RFID transponder 12 is, for example, brought into the sphere of scope of an RFID transceiver 9.

In FIG. 1 the reference number 1 relates to a telecommunication network. The telecommunication network 1 can be any network for creating communication links between network devices, for example a PSTN (Public Switched Telephone Network) network, a mobile radio network, for example a GSM (Global System for Mobile Communication) network, a UMTS (Universal Mobile Telecommunication Service) network or any other mobile radio network, an Internet-based network such as a Wireless Local Area Network (WLAN) or a Power Line Communication (PLC) network or a cable-based network (Cable TV) or any other telecommunication network for linking remote network devices. The telecommunication network 1 can also include several different networks, which can be linked via a suitable network connection module. The telecommunication network 1 can, for example, include a PSTN network and a mobile radio network as well as a suitable network connection module, so that network devices of the mobile radio network are connectable with network devices of the PSTN network.

In FIG. 1 the reference number 2 relates to a collection module according to the invention. The collection module 2 includes devices for storing RFID identification data and identifications of RFID transceivers as well as devices for selecting user instructions, as well as for controlling a user-controllable telecommunication device according to the selected user instruction. The collection module 2 is preferably designed as a programmed software module to run on a suitable computer. The person skilled in the art will know that the collection module will also be partly or wholly designed as hardware. The person skilled in the art will also understand that the collection module 2 can also be made up of separated devices, whereby these separated devices such as, for example, a device for storing a table and a device for selecting a user instruction, can be suitably be linked, for example via the telecommunication network 1. A collection module 2 can for example be connected to various user-controllable telecommunication devices 3 at the sa me time and thereby be operated from an independent operator.

In FIG. 1 the reference number 3 relates to a user-controllable telecommunication device. The user-controllable telecommunication device 3 is for example a central processing unit of a landline network or a Home Location Register of a mobile radio network or a Visiting Location Register or any similar register of a mobile radio network or any other user-controllable telecommunication device. The collection module 2 can be connected to the user-controlled telecommunication device 3 via any suitable connection, for example via an Ethernet cable or via a private network or via the telecommunication network 1 or via any other suitable connection, whereby the user-controlled telecommunication device 3 is controllable by the collection module 2 via the said connection. The user-controllable telecommunication device is further connectable to the telecommunication network 1, whereby services and functions of the user-controllable telecommunication device 3, such as, for example, a call forwarding service or an SIM card localizing service, can be offered in addition to the said connection to the telecommunication network 1 as well as in addition to devices connectable to this telecommunication network 1.

In FIG. 3 the reference number 4 relates to a mobile radio terminal, for example to a GSM (Global System for Mobile Communications) mobile radio terminal, connectable to the telecommunication network 1 via a mobile radio connection 5, to a UMTS (Universal Mobile Telecommunication Service) mobile radio terminal or to any other mobile radio terminal connectable to the telecommunication network 1. The reference numbers 6, 7 and 8 relate to several landline terminals, connectable via a landline connection, for example to an analog landline telephone an ISDN (Integrated Services Digital Network) landline telephone, a VoIP (Voice over IP) telephone or to any other landline terminal connectable to the telecommunication network 1. Further terminals could for example be TV equipment, radio receivers or Retinal Scanning Displays (RSD), which are connected to a telecommunication network and which, for example, do not possess keyboards or similar input devices. Thereby, for example, the choice of a film language can be entered by means of the method according to the invention and a corresponding RFID transponder.

In FIG. 1, the reference numbers 9 and 10 relate to two typical configurations of RFID transceivers. As an example, the RFID transceiver 9 is connectable to the telecommunication network 1 via a connection module 11. In addition, the RFID transceiver 10 has for example, been attached to the landline terminal 8. In order to execute the method according to the invention, any suitable arrangement can be selected for an RFID transceiver, whereby RFID identification data and an RFID transceiver identification can be transmitted to the collection module 2 via any connection. This way an RFID transceiver an for example be connected to a cable network socket for transmitting TV signals and for transmitting Internet data packages, whereby RFID identification data and an identification of an RFID transceiver can for example be transmitted via a suitable Internet connection to the collection module 2. In addition an RFID transceiver can be connected to a mains socket, whereby RFID identification data and an RFID transceiver identification can be transmitted via a power line base Internet connection to the collection module 2.

In FIG. 1 the reference number 12 relates to an RFID transponder. The RFID transponder 12 can, for example, be installed in a plastic card, for example in credit card format, whereby a user can easily carry several such plastic cards, each with a different RFID transponder, and whereby each of these plastic cards can be designed in a suitable color or with a suitable inscription for easy identification by the user. An RFID transponder 12 can however also be attached to an article of daily use of the user, such as a watch, a key ring, a mobile radio device or to a personalized ballpoint pen. An RFID transponder 12 is basically suitable to be used with all telecommunication networks.

The manufacturers of the RFID transponder 12 can, for example, program or store the operators of the telecommunication network 1, for example the mobile radio network operators, the RFID identification data or codes into the RFID transponders 12.

In an embodiment, the RFID transponder 12 is programmed with RFID identification data or an unambiguous code, to which an identity, for example the MSISDN or IMSI number of a mobile radio network user, can be assigned. In another embodiment, several RFID transponders 12 are programmed with the same RFID identification data or the same code. This way, for example, user-specific, device-specific or universally valid user instructions can be created.

The agent of data content could also release RFID transponders 12 for the payment for the data content to be transmitted. In case of a payment by means of the RFID transponder 12, the corresponding amount can be charged to an account linked to the RFID transponder 12. This account could for example be a prepaid, debit or postpaid account.

For inputting a ussr instruction, a user will select the desired RFID transponder 12 and bring it into the sphere of scope of a desired RFID transceiver 9, 10. As soon as the corresponding RFID transceiver 9, 10 detects the RFID transponder 12, the RFID transceiver 9, 10 transmits RFID identification data of the RFID transponder and an RFID transceiver identification to the collection module 2 via a connection between the RFID transponder and the collection module 2. The collection module then evaluates the RFID identification data and the RFID transceiver identification and selects a user instruction according to the tables containing RFID identification data and the RFID transceiver identification. The following table shows such a selection of a user instruction for the example of a call forwarding configuration:

| RFID transponders | RFID transceiver | Selected user instruction |
| --- | --- | --- |
| 12 | 9 | Activate call forwarding to mobile radio device 4 |
| 13 (not shown) | 9 | Deactivate call forwarding to mobile radio device 4 |
| 12 | 10 | Activate call forwarding to landline network device 8 |

The solution according to the invention provides a large number of solutions in a variety of applications. An RFID transceiver can, for example, be incorporated in a plug which is insertable into a mains socket. In addition to the RFID transceiver the plug includes, for example, a connection module 11 for connecting the RFID transceiver with a collection module 2, as well as, for example, electronic keys and/or certificates for securing a data connection between the connection module 11 and the collection module 2 as described below. The connection module 11 can for example include an Internet protocol interface as well as an interface for transmitting Ethernet data packages via the mains cable. A secure Internet protocol-based connection between the connection module 11 and the collection module 2 can, for example, be established via an ADSL modem, also equipped with a mains socket and an interface for transmitting Ethernet data packages via the mains cable as well as via a corresponding Internet protocol interface of the collection module 2 as well as corresponding keys and/or certificates of the collection modules 2. The plug with the RFID transceiver can be placed at a suitable location, for example at the entrance to an office. The user of the office can now equip one of his personal articles of daily use, for example his watch, with an RFID transponder, whereby RFID identification data and an RFID transceiver identification are transmitted to the collection module 2 by means of the connection module 11, a soon as the user is within the sphere of scope of the RFID transceiver. According to the invention, this way the user-controllable telecommunication device 3 is controlled according to a user instruction assigned to the RFID identification data and the RFID transceiver identification. The sphere of cope of the RFID transceiver can, for example, be designed in such a way that it covers the entire office space of the user's office and the user instruction can for example include the deactivation of call forwarding to the telephone number of a landline telephone installed in the user's office. The connection module 11 can for example include means for instructing the RFID transceiver to test the RFID identification data of the RFID transponder at a particular time, whereby the connection module 11 will, after a successful test, again transmit the RFID identification data as well as the RFID transceiver identification to the collection module 2. The collection module 2 can, for example, include a validation module, whereby, for example, the validity duration of a user instruction and a second user instruction are set by the validation module, which second user instruction is used for controlling the user-controllable telecommunication device 3 after the expiration of the validity period of the user instruction.

In a further example of a possible application of the method according to the invention, the user-controllable telecommunication device 3 relates to the in-house switchboard of a business. The collection module 2 is, for example, installed in this internal switchboard and RFID transceivers are, for example, installed on the telephone device operated by the internal switchboard. As soon as, for example, a user places a plastic card with an RFID transponder inside the sphere of scope of an RFID transceiver, RFID identification data and an RFID transceiver identification are transmitted to the collection module 2 by means of a connection module 11, whereby the collection module controls the internal switchboard with an appropriate user instruction in such a way that a user profile assigned to the RFID transponder is, for example, loaded onto the corresponding telephone device by the internal switchboard. By means of additional plastic cards with RFID transponders, the user can, for example, also decide that he does not want to be disturbed for the moment, and calls are for example, answered by the internal switchboard with an automatic message or forwarded to a definable call forwarding number.

In a further example of a possible application of the method according to the invention, the user-controllable telecommunication device relates to a central processing unit of a payment transaction process. An RFID transceiver is for example installed at the cash desk of a store. A client of me store can, for example, bring an RFID transponder into the sphere of scope of the RFID transceiver to pay for purchases whereby RFID identification data and an RFID transceiver identification are transmitted to a collection module 2. The collection module 2 thereby obtains sufficient information for controlling the central processing unit of the payment transaction procedure by means of a user instruction in such a way that an appropriate payment transaction can be initiated. In order to secure this method, an input unit, linked to the cash register or to an RFID transceiver can be attached to the cash register for entering a personal secret, whereby this personal secret can be transmitted to the collection module 2 for verification.

In a further example of a possible application of the method according to the invention, the RFID transceiver relates to a portable device, which is, for example, connectable to a WLAN hotspot of a telecommunication network via a wireless interface by means of a connection module 11. The RFID transponder 12 further relates to small modules that can be installed in the housing of the RFID transceiver. The housing of the RFID transceiver and the RFID transponders are designed in such a way that pushing one of the RFID transponders into the housing of the RFID transceiver initiates the corresponding user instruction. This has the advantage that the whole device is a single, mobile and portable unit and that the RFID transponders can not get lost.

The invention claimed is:

1. A system for inputting a user instruction to a central processing unit of a telephone service provider, the user instruction configured to divert calls from a first telecommunication device to a second telecommunication device, a user selecting an RFID transponder from a plurality of RFID transponders, and bringing the selected RFID transponder into a sphere of scope of an RFID transceiver, the system comprising:
    means for transmitting RFID identification data of the selected RFID transponder to the RFID transceiver over an RFID interface, the RFID transceiver having an RFID transceiver identification;
    means for forwarding the RFID identification data and the RFID transceiver identification from the RFID transceiver to a connection module that is connected to the Internet, the means for transmitting RFID identification data and the means for forwarding the RFID identification data being separate devices from the first and the second telecommunication device;
    means for transmitting the RFID identification data and the RFID transceiver identification from the RFID transceiver from the connection module to a collection module of the central processing unit over the Internet;

wherein the collection module includes means for requesting data from at least one of a table that links the RFID identification data and the RFID transceiver identification to the different user instructions that are associated with the plurality of RFID transponders, and means for selecting the specific user instruction assigned to (i) the RFID identification data and to (ii) the RFID transceiver identification; and wherein the collection module includes means for controlling the central processing unit by the specific user instruction by changing at least one of a switchboard of a landline network or a Home Location Register of a mobile radio network of the telephone service provider to divert calls from the first telecommunication device to the second telecommunication device.

2. The system for inputting a user instruction according to claim 1, wherein neither the first nor the second telecommunication device is used for inputting the user instruction to the central processing unit.

3. A method for inputting a user instruction to a central processing unit of a telephone service provider, the user instruction configured to divert calls from a first telecommunication device to a second telecommunication device, the method comprising:

selecting an RFID transponder from a plurality of RFID transponders, the selected RFID transponder corresponding to a specific user instruction;

bringing the selected RFID transponder into a sphere of scope of an RFID transceiver;

transmitting RFID identification data of the selected RFID transponder to the RFID transceiver over an RFID interface, the RFID transceiver having an RFID transceiver identification;

forwarding the RFID identification data and the RFID transceiver identification to a connection module that is connected to the Internet, the RFID transceiver and the connection module being separate devices from the first and the second telecommunication device;

transmitting the RFID identification data and the RFID transceiver identification from the connection module to a collection module over the Internet;

selecting the specific user instruction by the collection module by using a table that links (i) the RFID identification data and (ii) the RFID transceiver identification to the different user instructions that are associated to the plurality of RFID transponders; and controlling the central processing unit of the telephone service provider with the selected user instruction by changing at least one of a switchboard of a landline network or a Home Location Register of a mobile radio network of the telephone service provider to divert calls from the first telecommunication device to the second telecommunication device.

4. The method for inputting a user instruction according to claim 3, wherein neither the first nor the second telecommunication device is used for inputting the user instruction to the central processing unit.

5. A collection module for controlling a central processing unit of a telephone service provider by a user instruction, the user instruction configured to divert calls from a first telecommunication device to a second telecommunication device, a user selecting an RFID transponder from a plurality of RFID transponders, and bringing the selected RFID transponder into a sphere of scope of an RFID transceiver, the RFID transceiver having an RFID transceiver identification, the collection module comprising:

means for receiving RFID identification data and RFID transceiver identifications by the Internet from the selected RFID transponder that was brought into the sphere of scope of the RFID transceiver via a connection module that is in communication with the RFID transceiver and the connection module is connected to the Internet, the RFID transceiver and the connection module being separate devices from the first and the second telecommunication device;

means for requesting data from at least one table that links the RFID identification data and the RFID transceiver identification to the different user instructions that are associated with the plurality of RFID transponders;

means for selecting the specific user instruction assigned to (i) the RFID identification data and (ii) the RFID transceiver identification; and means for controlling the central processing unit by the specific user instruction by changing at least one of a switchboard of a landline network or a Home Location Register of a mobile radio network of the telephone service provider to divert calls from the first telecommunication device to the second telecommunication device.

6. The collection module for controlling a central processing unit according to claim 5, wherein neither the first nor the second telecommunication device is used for inputting the user instruction to the central processing unit.

* * * * *